(12) United States Patent  
Fujitani et al.

(10) Patent No.: US 11,975,613 B2  
(45) Date of Patent: May 7, 2024

(54) VARIABLE-GAUGE TRAIN CONTROL APPARATUS AND VARIABLE-GAUGE TRAIN PROPULSION CONTROL SYSTEM

(71) Applicants: Mitsubishi Electric Corporation, Tokyo (JP); KYUSHU RAILWAY COMPANY, Fukuoka (JP)

(72) Inventors: Kohei Fujitani, Tokyo (JP); Shinsuke Kadoi, Tokyo (JP); Tsuyoshi Morimitsu, Fukuoka (JP); Yuichi Mimura, Fukuoka (JP); Soichiro Watanabe, Fukuoka (JP)

(73) Assignees: MITSUBISHI ELECTRIC CORPORATION, Tokyo (JP); KYUSHU RAILWAY COMPANY, Fukuoka (JP)

( * ) Notice: Subject to any disclaimer, the term of this patent is extended or adjusted under 35 U.S.C. 154(b) by 553 days.

(21) Appl. No.: 17/274,024

(22) PCT Filed: Sep. 11, 2018

(86) PCT No.: PCT/JP2018/033681  
§ 371 (c)(1),  
(2) Date: Mar. 5, 2021

(87) PCT Pub. No.: WO2020/053970  
PCT Pub. Date: Mar. 19, 2020

(65) Prior Publication Data  
US 2021/0339633 A1 Nov. 4, 2021

(51) Int. Cl.  
*B60L 15/20* (2006.01)  
*B61F 7/00* (2006.01)  
(Continued)

(52) U.S. Cl.  
CPC ............... *B60L 15/20* (2013.01); *B61F 7/00* (2013.01); *B61L 15/0072* (2013.01);  
(Continued)

(58) Field of Classification Search  
CPC ........ B60L 15/20; B60L 2200/26; B61F 7/00; B61L 15/0072; B61L 25/021; B61L 25/025  
See application file for complete search history.

(56) References Cited

U.S. PATENT DOCUMENTS

2012/0256574 A1* 10/2012 Tanaka .................. B60L 7/14  
257/77  
2018/0312079 A1* 11/2018 Konishi ................. B60L 15/20

FOREIGN PATENT DOCUMENTS

JP 2002233005 A * 8/2002  
JP 2002233005 A 8/2002

OTHER PUBLICATIONS

English Machine Translation of JP2002/233005A (Year: 2002).*  
(Continued)

*Primary Examiner* — Andrew J Cromer  
(74) *Attorney, Agent, or Firm* — BUCHANAN INGERSOLL & ROONEY PC

(57) ABSTRACT

A variable-gauge train control apparatus for a variable-gauge train having a gauge variable in a gauge conversion section includes: a plurality of main motors that transmits driving force to axles and wheels; a plurality of inverters that outputs voltage to at least one of the main motors; and voltage control units that control the individual output voltages of the plurality of inverters. Each of the voltage control units corresponds to one of the inverters and, when at least one of the axles to be subjected to the driving force controlled by the corresponding one inverter is within the gauge conversion section, controls the speed of the associ- (Continued)

ated main motors by using, as a speed command value, a train speed converted into a rotational frequency.

8 Claims, 10 Drawing Sheets

(51) Int. Cl.
 *B61L 15/00* (2006.01)
 *B61L 25/02* (2006.01)
(52) U.S. Cl.
 CPC ......... *B61L 25/021* (2013.01); *B60L 2200/26* (2013.01); *B61L 25/025* (2013.01)

(56) References Cited

OTHER PUBLICATIONS

International Search Report (PCT/ISA/210) with translation and Written Opinion (PCT/ISA/237) dated Dec. 11, 2018, by the Japan Patent Office as the International Searching Authority for International Application No. PCT/JP2018/033681.

\* cited by examiner

VARIABLE-GAUGE TRAIN CONTROL APPARATUS AND VARIABLE-GAUGE TRAIN PROPULSION CONTROL SYSTEM

FIELD

The present invention relates to a variable-gauge train control apparatus and a variable-gauge train propulsion control system for a variable-gauge train including a main motor to be controlled by the control apparatus.

BACKGROUND

For a variable-gauge train, an interval between wheels provided for a train car is changed when that train car passes through a gauge converter that interconnects tracks of different gauges. The gauge converter supports a train body so that the wheels are not subjected to the weight of the train body. Furthermore, the gauge converter changes the interval between the wheels by moving the wheels in an axle direction along guide rails while keeping the train body supported. Therefore, the wheels race during the change in the interval between the wheels.

CITATION LIST

Patent Literature

Patent Literature 1: Japanese Patent Application Laid-open No. 2002-233005

SUMMARY

Technical Problem

In many cases, a plurality of main motors and a plurality of inverters that drives the plurality of main motors are installed in a single train. Especially in the case of a variable-gauge train, when a main motor to be controlled by some inverter and an axle connected to that main motor are passing through the gauge converter, the other inverters need to contribute to propulsion of the train. When a train speed changes due to, for example, a train driver's operation during passage of a train car through the gauge converter, the speed of the racing wheels and the train speed may differ from each other. When the train car attempts to get out of the gauge converter in such a state, the racing wheels come into contact with the rails again and thus wearing-away is caused due to friction between the wheels and rails. Such a problem is not particularly considered in Patent Literature 1. Furthermore, as disclosed in Patent Literature 1, the method for reducing the torque of a main motor that drives the racing wheels takes no measures to eliminate the difference between a train speed and a racing speed of the wheels when the train speed exceeds the racing speed of the wheels.

The present invention has been made in view of the above, and an object of the present invention is to provide a variable-gauge train control apparatus and a variable-gauge train propulsion control system capable of preventing wearing-away of wheels and rails due to friction.

Solution to Problem

In order to solve the above-described problem and achieve the object, the present invention is a variable-gauge train control apparatus to be applied to a variable-gauge train and to control a plurality of main motors that transmits driving force to axles of the variable-gauge train, the train having a gauge that changes in a gauge conversion section. The apparatus comprises: an inverter to output voltage to at least one of the main motors; and a voltage control unit to control an output voltage of the inverter. When at least one of the axles to be subjected to the driving force controlled by the inverter is within the gauge conversion section, the voltage control unit controls speeds of the main motors by using, as a speed command value, a train speed converted into a rotational frequency.

Advantageous Effects of Invention

According to the present invention, it is possible to achieve the effect of synchronizing the train speed and the wheel speed to thereby prevent wearing-away of the wheels and the rails due to the friction that may be produced when a train car gets out of a gauge converter.

DESCRIPTION OF EMBODIMENTS

Variable-gauge train control apparatuses and variable-gauge train propulsion control systems for variable-gauge trains to be controlled by the control apparatuses according to embodiments of the present invention will be described in detail below with reference to the drawings. Note that the present invention is not limited to the following embodiments.

First Embodiment

Figure 1:
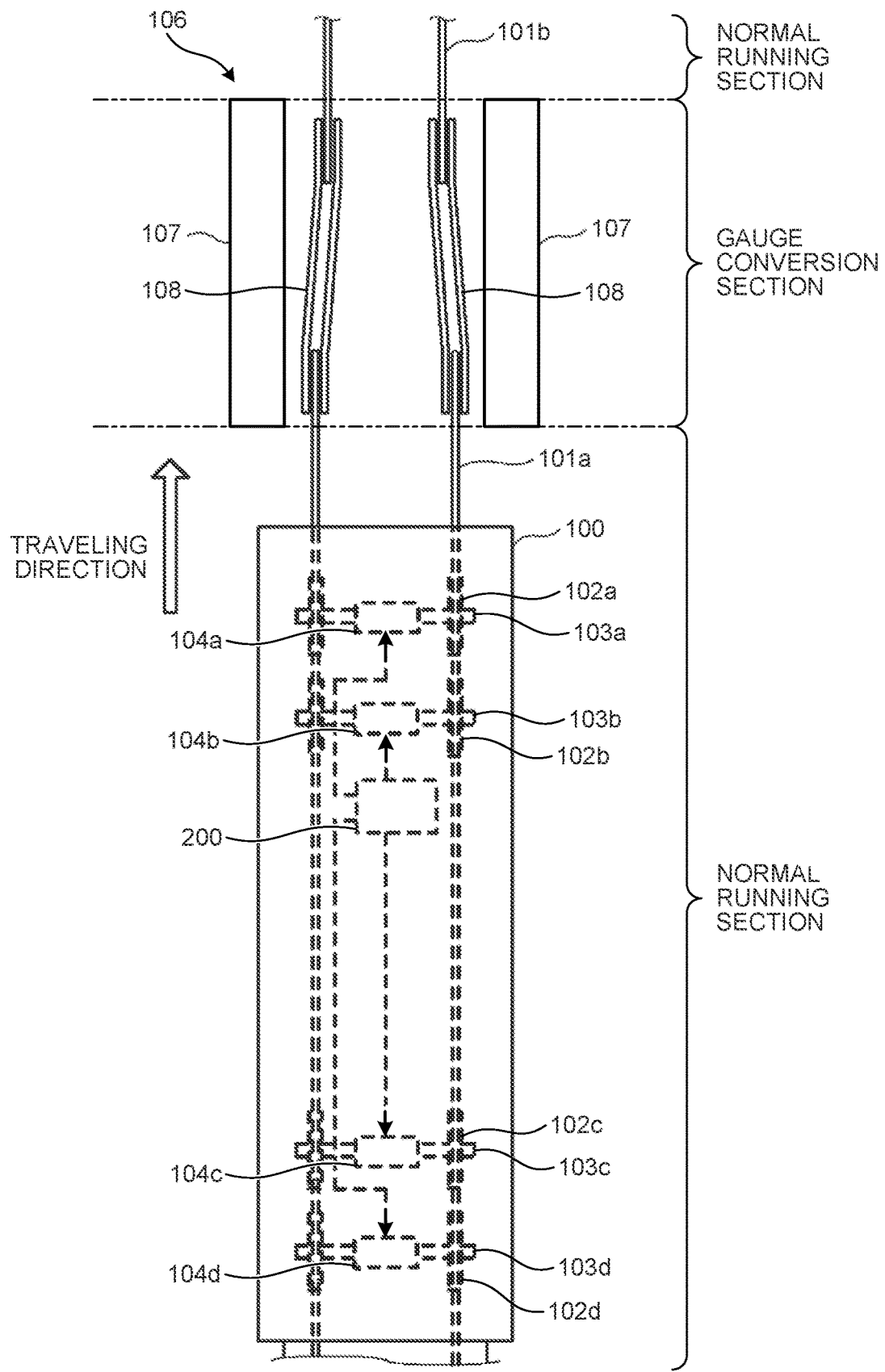
FIG. 1 is a diagram illustrating a configuration of a variable-gauge train according to a first embodiment.

FIG. 1 is a diagram illustrating a configuration of a variable-gauge train according to a first embodiment. As illustrated in FIG. 1, a variable-gauge train 100 according to the first embodiment is an electric railcar that runs directly through tracks 101a and 101b that are different in gauge. As illustrated in FIG. 1, the variable-gauge train 100 includes four pairs of wheels 102a to 102d, four axles 103a to 103d, four main motors 104a to 104d, and a control apparatus 200. Each of the pairs of wheels 102a to 102d is arranged in such a way as to face each other in the direction of the width of a train body. Each of the axles 103a to 103d is a center of rotation of a corresponding one of the pairs of wheels 102a to 102d. The main motors 104a to 101d are provided in association with the four axles 103a to 103a, respectively. The control apparatus 200 is for controlling the torque and speed of the main motors 104a to 104d. Here, the torque of the four main motors 104a to 104a refers to torque output by each of the main motors 104a to 104d. Furthermore, the speed of the four main motors 104a to 104d refers to a speed at which each of the main motors 104a to 104d rotates. Note that the variable-gauge train 100 may be a train of a plurality of connected cars with some of the main motors 104a to 104d installed in a different cat from cars having the other main motors installed therein.

Furthermore, the variable-gauge train 100 includes a mechanism (not illustrated) for changing the interval between each of the pairs of wheels 102a to 102d in an axle direction while the variable-gauge train 100 passes through a gauge converter 106 as illustrated in FIG. 1.

The gauge converter 106 is provided between a normal running section of the track 101a and a normal running section of the track 101b. Hereinafter, a section including the gauge converter 106 will be referred to as a gauge conversion section. The gauge converter 106 includes body supports 107 and guide rails 108. While the train body passes through the gauge conversion section, the train body is supported by the body supports 107 from below. The guide rails 108 guide the wheels 102a to 102d passing through the gauge conversion section.

The body supports 107 support the train body from below so that the wheels 102a to 102d passing through the gauge conversion section are not subjected to the weight of the train body. As a result, any of the pairs of wheels 102a to 102d, passing through the gauge conversion section becomes out of contact with rails of the tracks 101a and 101b and suspended in the air. The body supports 107 each have a length in the direction of the length of the variable-gauge train 100, and the length of the body support 107 is large enough to allow the four pairs of wheels 102a to 102d to be suspended in the air.

The guide rails 108, which abut on the wheels 102a to 102d passing through the gauge conversion section, move the wheels 102a to 102d in the axle direction. The wheels 102a to 102d passing through the gauge conversion section move along the guide rails 108 as the variable-gauge train 100 advances. As a result, the wheels 102a to 102d passing through the gauge conversion section move in the axle direction. Therefore, when the variable-gauge train 100 passes through the gauge converter 106, the interval between each of the pairs of wheels 102a to 102d in the axle direction increases or decreases in accordance with the traveling direction of the variable-gauge train 100.

Specifically, assume that the variable-gauge train 100 advances in the traveling direction indicated by an arrow in FIG. 1 and enters the gauge converter 106 from the normal running section of the track 101a. Then, the variable-gauge train 100 is supported by the body supports 107, and as a result, the wheels 102a and 102b passing through the gauge conversion section are not subjected to the weight of the train body. In this case, the wheels 102a and 102b abut on the guide rails 108, such that the interval between each of the pairs of wheels 102a and 102b in the axle direction gradually decreases as the variable-gauge train 100 advances. Similarly, the interval between each of the pairs of wheels 102c and 102d in the axle direction gradually decreases as the variable-gauge train 100 advances. The variable-gauge train 100 advances in the traveling direction indicated by the arrow in FIG. 1, thereby reducing the interval between each of the pairs of wheels 102a to 102d in the axle direction. In contrast to the above, when the variable-gauge train 100 travels in a direction opposite to the arrow in FIG. 1, the interval between each of the pairs of wheels 102a to 102d in the axle direction increases.

Figure 2:
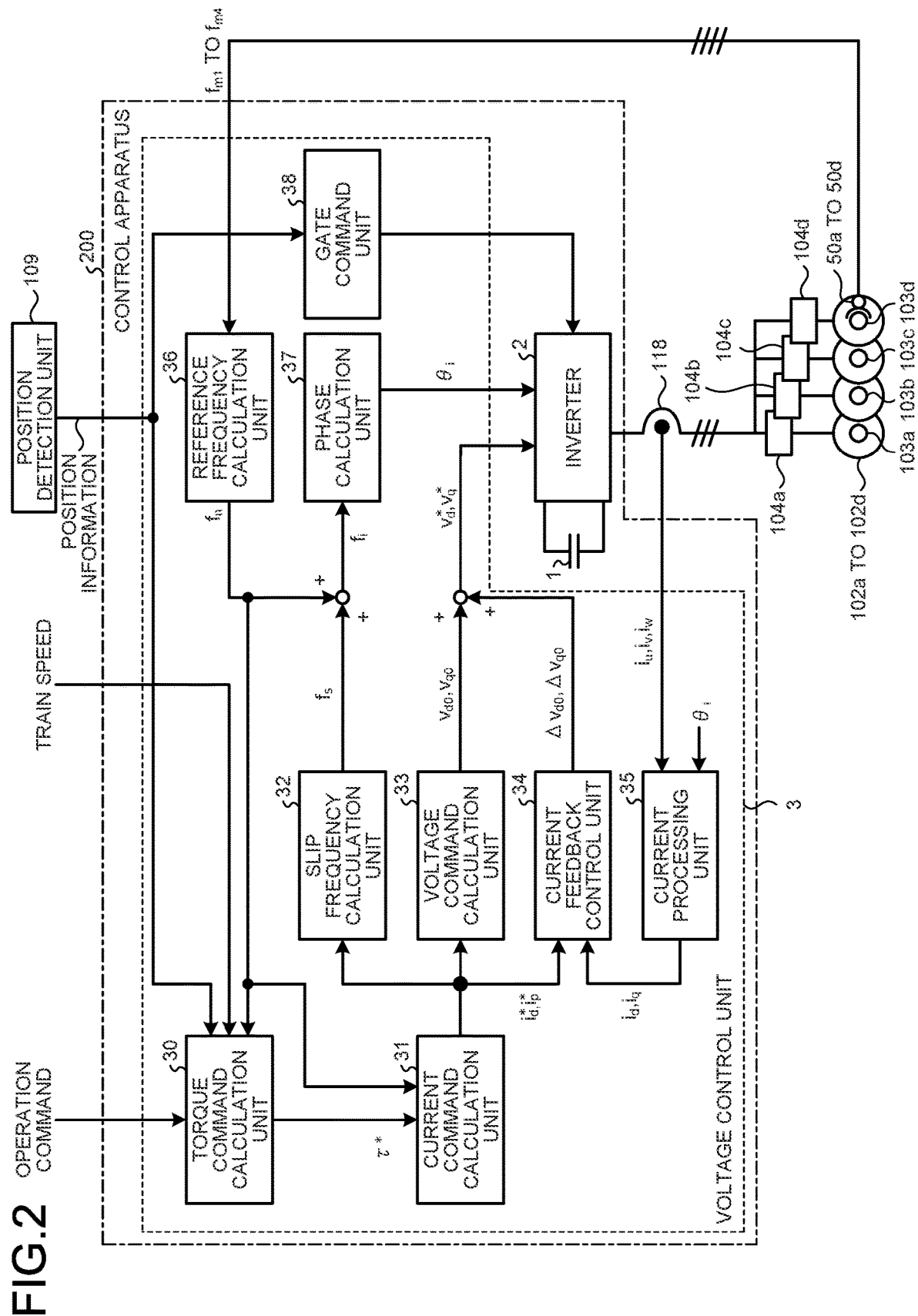
FIG. 2 is a block diagram illustrating a configuration of a control apparatus according to the first embodiment.

The control apparatus 200 according to the present embodiment is a control apparatus to be installed in the variable-gauge train 100. By way of example, FIG. 2 illustrates a configuration in which a single inverter 2 controls the driving of the plurality of main motors 104a to 104d. Note that the single inverter 2 in the control apparatus 200 may control the driving of a single main motor or two or more main motors.

The main motor is roughly classified into the following two types: an induction motor and a synchronous motor. As the synchronous motor needs to have a rotation speed synchronized with a voltage applied thereto, in principle, a system using synchronous motors typically include inverters one of which drives the corresponding one of the synchronous motors. In contrast, Meanwhile, a system using the induction motors often includes a single inverter for driving a plurality of the motors. In the example of FIG. 2, the main motors 104a to 104d are induction motors.

As illustrated in FIG. 2, the control apparatus (hereinafter, simply referred to as "control apparatus") 200 to be installed in the variable-gauge train 100 includes a DC power source 1, the inverter 2, and a voltage control unit 3. The inverter 2 collectively controls the torque of the four main motors 104a to 104d. The voltage control unit 3 controls the output voltage of the inverter 2. Furthermore, the voltage control unit 3 includes a torque command calculation unit 30, a current command calculation unit 31, a slip frequency calculation unit 32, a voltage command calculation unit 33, a current feedback control unit 34, a current processing unit 35, a reference frequency calculation unit 36, a phase calculation unit 37, and a gate command unit 38. Input to the control apparatus 200 are position information from a position detection unit 109, detection information from a current sensor 118 provided for detecting the total value of currents flowing through the four main motors 104a to 104d, and an operation command from a driver's platform (not illustrated). Furthermore, a train speed converted into the electric frequency of the motor is input to the control apparatus 200. The train speed is, for example, speed information managed by a train information management system or speed information from a train speed sensor (not illustrated) attached to a trailing wheel. Note that while the example illustrated in FIG. 2 is based on the assumption that processing of converting the train speed is performed outside the control apparatus 200, but the processing of converting the train speed can be performed inside the control apparatus 200.

Furthermore, the following description gives an example of vector control for decomposing detected three-phase current values in a stationary coordinate system into currents in a two-axis orthogonal rotating coordinate system, and controlling these currents in controlling the torque of the main motors 104a to 104d. Specifically, the vector control given below by way of example decomposes a U-phase current $i_u$, a V-phase current $i_v$, and a W-phase current $i_w$ into a d-axis current $i_d$ and a q-axis current $i_q$ and controls the d- and q-axis currents in controlling the torque of the main motors 104a to 104d. The d-axis current $i_d$ is a current value of a magnetic flux axis component of a dq-axis coordinate system, and the q-axis current $i_q$ is a current of a torque axis component of the dq-axis coordinate system. Meanwhile, needless to say, the present invention can also be applied to other than the vector control.

The torque command calculation unit 30 calculates a torque command value $\tau^*$ on the basis of notch information included in the operation command. The torque command value $\tau^*$ is a command value of torque that should be generated by each of the main motors 104a to 104d. Furthermore, position information output from the position detection unit 109, which will be described below, and a train speed are input to the torque command calculation unit 30. The roles of the position information and the train speed in the torque command calculation unit 30 will be described below. The current command calculation unit 31 calculates, on the basis of the torque command value $\tau^*$ and a reference frequency $f_n$, a d-axis current command $i_d^*$ and a q-axis current command $i_q^*$ to be sent to the main motors 104a to 104d. The reference frequency $f_n$ will be described below. Note that the d-axis current command $i_d^*$ and the q-axis current command $i_q^*$ calculated by the current command calculation unit 31 may be current commands to be sent to a single main motor or current commands to be sent to the four main motors.

The slip frequency calculation unit 32 calculates a slip frequency command $f_s$ on the basis of the d-axis current command $i_d^*$ and the q-axis current command $i_q^*$ from the current command calculation unit 31. The slip frequency command $f_s$ is a slip frequency that should be given to the main motors 104a to 104d. The voltage command calculation unit 33 calculates a d-axis voltage command $v_{d0}$ and a q-axis voltage command $v_{q0}$. The d-axis voltage command $v_{d0}$ is based on the d-axis current command $i_d^*$ and the q-axis current command $i_q^*$. The q-axis voltage command $v_{q0}$ is based on the d-axis current command $i_d^*$ and the q-axis current command $i_q^*$. The current processing unit 35 calculates the d-axis current $i_d$ and the q-axis current $i_q$ on the basis of a control phase angle $\theta_i$, and the U-phase current $i_u$, V-phase current $i_v$ and W-phase current $i_w$. The control phase angle $\theta_i$ is calculated by the phase calculation unit 37, which will be described below. The U-phase current $i_u$, v-phase current $i_v$, and W-phase current $i_w$ are detected by the current sensor 118.

The current feedback control unit 34 calculates a d-axis correction amount $\Delta v_{d0}$ and a q-axis correction amount $\Delta v_{q0}$ on the basis of the d-axis current command $i_d^*$ and q-axis current command $i_q^*$ from the current command calculation unit 31 and the d-axis current $i_d$ and q-axis current $i_q$ from the current processing unit 35. The d-axis correction amount $\Delta v_{d0}$ and the q-axis correction amount $\Delta v_{q0}$, which are intended for current feedback control, are a correction amount for the d-axis voltage command and a correction amount for the q-axis voltage command, respectively. The d-axis voltage command $v_{d0}$ calculated by the voltage command calculation unit 33 and the d-axis correction amount $\Delta v_{d0}$ output by the current feedback control unit 34 are added to provide a corrected d-axis voltage command $v_d^*$ to be given to the inverter 2. Furthermore, the q-axis voltage command $v_{q0}$ calculated by the voltage command calculation unit 33 and the q-axis correction amount $\Delta v_{q0}$ output by the current feedback control unit 34 are added to provide a corrected q-axis voltage command $v_q^*$ to be given to the inverter 2.

The position detection unit 109 calculates position information on the four axles 103a to 103d on the basis of an output from a device or sensor that outputs position information. The position detection unit 109 outputs the result of the calculation to the torque command calculation unit 30. Note that the device or sensor that outputs position information is, for example, an automatic train stop (ATS) ground element or a global positioning system (GPS) receiver.

As illustrated in FIG. 2, rotation sensors 50a to 50d are provided for the axles 103a to 103d, respectively. Each of the rotation sensors 50a to 50d measures a rotational frequency of the corresponding one of the axles 103a to 103d, and outputs the measured rotational frequency to the reference frequency calculation unit 36. Note that in the present embodiment, pieces of information on the rotational frequencies measured by the rotation sensors 50a to 50d are treated as rotational frequencies $f_{m1}$ to $f_{m4}$ each of which is a rotational frequency of the corresponding one of the main motors 104a to 104d.

Note that needless to say, it is possible to perform conversion from the rotational frequency of the main motor to the rotational frequency of the axle or vice versa on the basis of a gear ratio. Furthermore, the main motor has two different types of rotational frequency, one of which is a mechanical frequency that represents the mechanical rotation speed of a rotor. The other type of the rotational frequency is an electric frequency obtained by conversion of the mechanical frequency into the frequency of the electric quantity of a stator circuit. These frequencies can be easily converted based on the number of pole pairs of the main motor. Therefore, in the following description, the mechanical frequencies and electric frequencies of a wheel, an axle, and a main motor connected to the axle are each considered convertible by use of a constant, and are not strictly distinguished from each other. Furthermore, the rotational frequency of a wheel is converted using the diameter of the wheel, into a speed in linear motion. In contrast, a train speed is converted using the diameter of the wheel, into a rotational frequency in rotational motion. Therefore, in the following description, the rotational frequencies of a main motor, an axle and a wheel may be simply referred to as "speed" or "rotation speed".

The reference frequency calculation unit 36 calculates the reference frequency $f_n$ on the basis of information on the rotational frequencies from the rotation sensors 50a to 50d. A general method for calculating the reference frequency $f_n$ is that which treats the average value of the rotational frequencies $f_{m1}$ to $f_{m4}$ as the reference frequency. The reference frequency $f_n$ calculated by the reference frequency calculation unit 36 and the slip frequency command $f_s$ calculated by the slip frequency calculation unit 32 are added and given as an inverter frequency $f_i$ to the phase calculation unit 37. The inverter frequency $f_i$ is the frequency of the output voltage of the inverter 2.

Note that although FIG. 2 illustrates an example in which the rotational frequencies of the main motors 104a to 104d are acquired by the rotation sensors 50a to 50d, a speed estimator that estimates the rotational frequencies of the main motors 104a to 104a by using the d-axis voltage command $v_{d0}$, the q-axis voltage command $v_{q0}$, the d-axis current $i_d$, and the q-axis current $i_q$ may be provided. For such a configuration as so-called speed sensorless control, the speeds of the main motors 104a to 104d can not be individually determined, and thus only a representative one of the speeds of the main motors 104a to 104d is calculated, in which case an output from the speed estimator is the reference frequency $f_n$.

The phase calculation unit 37 calculates the control phase angle $\theta_i$ on the basis of the inverter frequency $f_i$. The control phase angle $\theta_i$ is a phase angle that is referred to when coordinate transformation is performed from the stationary coordinate system to the rotating coordinate system or vice versa. The control phase angle $\theta_i$ can be obtained by integration of the inverter frequency $f_i$.

On the basis of the position information output from the position detection unit 109, the gate command unit 38 switches a voltage output from the inverter 2 between an on state and an off state. Hereinafter, a state in which the inverter 2 is outputting a voltage is referred to as "gating-on", and a state in which output of the voltage from the inverter 2 is stopped is referred to as "gating-off".

Figure 3:
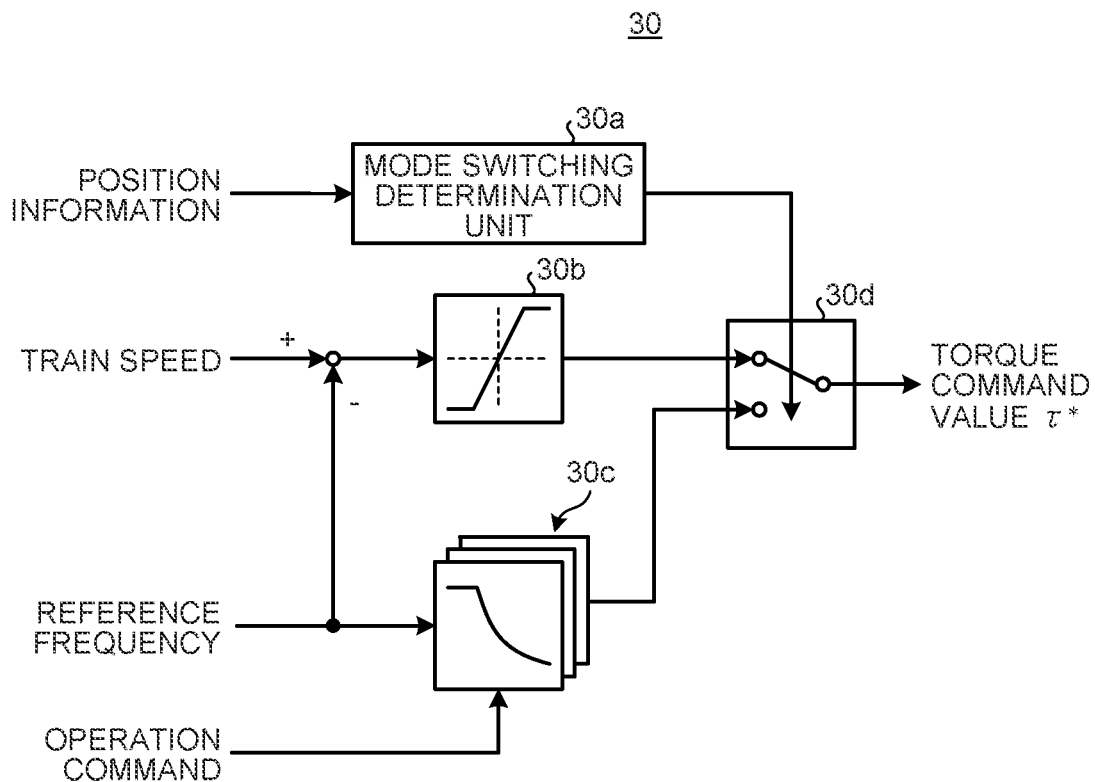
FIG. 3 is a block diagram illustrating a configuration example of a torque command calculation unit according to the first embodiment.

Next, detailed operation of the torque command calculation unit 30 will be described with reference to FIGS. 3 to 6. FIG. 3 is a block diagram illustrating a configuration example of the torque command calculation unit according to the first embodiment.

In FIG. 3, the torque command calculation unit 30 includes a mode switching determination unit 30a, a gauge conversion torque pattern generation unit 30b, a normal running torque pattern generation unit 30c, and a torque command value selection unit 30d.

On the basis of the position information on the four axles 103a to 103d calculated by the position detection unit 109, the mode switching determination unit 30a switches a method for calculating the torque command value $\tau^*$. Specifically, when at least one of the axles 103a to 103d is within the gauge conversion section, a torque command value is output on the basis of information on the difference between a train speed and the reference frequency, with reference to a gauge conversion torque pattern held in the gauge conversion torque pattern generation unit 30b. Meanwhile, when all the axles 103a to 103d are located outside the gauge conversion section, the torque command value $\tau^*$ is output based on the reference frequency and the notch information included in the operation command, with reference to a normal running torque pattern held in the normal running torque pattern generation unit 30c.

Figure 4:
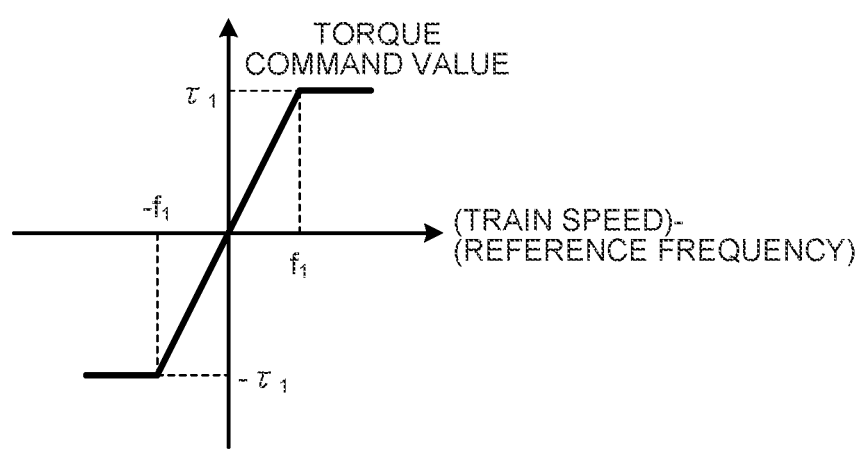
FIG. 4 is a diagram illustrating an example of a gauge conversion torque pattern in the first embodiment.
Figure 5:
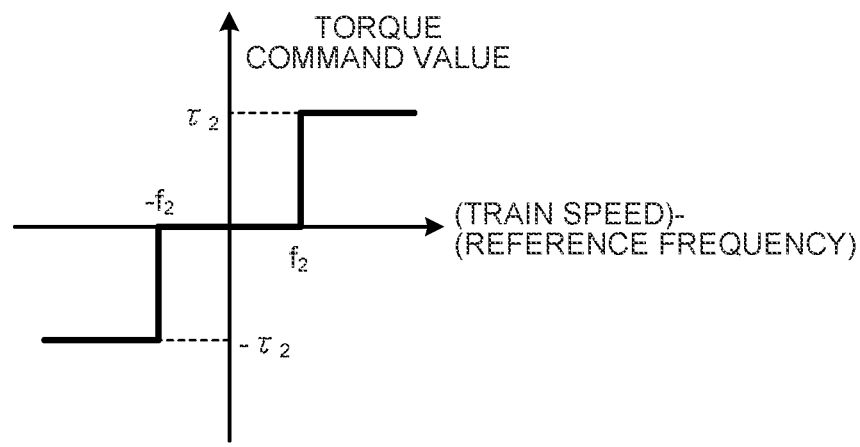
FIG. 5 is a diagram illustrating another example of the gauge conversion torque pattern in the first embodiment.

The gauge conversion torque pattern generation unit 30b generates the gauge conversion torque pattern by using the difference between the train speed and the reference frequency as an argument. The gauge conversion torque pattern is a look-up table for outputting a torque command value. A torque pattern as illustrated in FIG. 4 or 5 can be cited as an example of the gauge conversion torque pattern. In FIG. 4 or 5, the horizontal axis represents the difference between the train speed and the reference frequency, and the vertical axis represents the magnitude of the torque command value.

The torque pattern illustrated in FIG. 4 limits the absolute value of the torque command value to $\tau 1$ when the absolute value of the difference between the train speed and the reference frequency $f_n$ exceeds a first value $f_1$. The torque pattern illustrated in FIG. 4 outputs a larger torque command value as the absolute value becomes larger until the absolute value of the difference between the train speed and the reference frequency $f_n$ exceeds the first value $f_1$. Therefore, when the reference frequency $f_n$ is smaller than the train speed, a positive torque command value is generated to accelerate the main motors 104a to 104d. Accordingly, the rotation speeds of the axles 103a to 103d increase, and the reference frequency $f_n$ also increases and eventually agrees with the train speed. Furthermore, when the reference frequency $f_n$ is larger than the train speed, a negative torque command value is generated to decelerate the main motors 104a to 104d. Accordingly, the rotation speeds of the axles 103a to 103d decrease, and the reference frequency $f_n$ also decreases and eventually agrees with the train speed.

Furthermore, the torque pattern of FIG. 5 keeps the absolute value of the torque command value at a constant value $\tau 2$ when the absolute value of the difference between the train speed and the reference frequency $f_n$ exceeds a second value $f_2$. The torque pattern of FIG. 5 provides a dead zone in which the torque command value is kept at zero so that no torque command value is output until the absolute value of the difference between the train speed and the reference frequency $f_n$ exceeds the second value $f_2$. In this way, providing the dead zone in which the torque command value is kept at zero achieves the effect of preventing the torque command value from fluctuating upon occurrence of a slight change in the train speed. This is especially effective when the resolution of train speed information is low. As in the case of using the torque pattern of FIG. 4, the rotation speeds of the axles 103a to 103d substantially agree with the train speed in this case.

Figure 6:
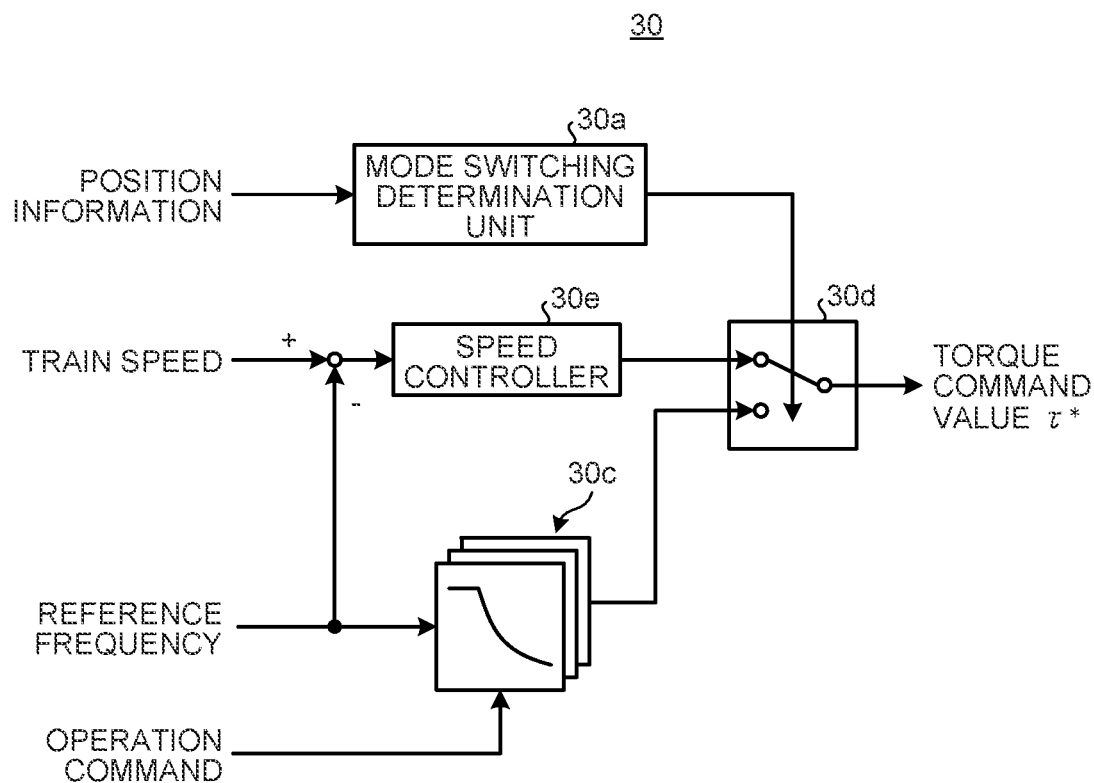
FIG. 6 is a block diagram illustrating another configuration example of the torque command calculation unit according to the first embodiment.

Furthermore, FIG. 6 is a block diagram illustrating another configuration example of the torque command calculation unit according to the first embodiment. The block diagram of FIG. 6 differs from that of FIG. 3 in that a speed controller 30e is provided instead of the gauge conversion torque pattern generation unit 30b. A typical example of the speed controller 30e is a proportional integral compensator referred to as a PI compensator. There is concern that the method using the look-up tables as illustrated in FIGS. 4 and 5 leads to the oscillatory speeds of the axles 103a to 103d. For this reason, the difference between the train speed and the reference frequency is input to the speed controller 30e for forming a feedback loop for speed control, thereby achieving more accurately control that reduces the influence of various disturbances and makes racing speeds of the axles 103a to 103d equal to the train speed.

Switching the methods for calculating the torque command value as described above can be rephrased as switching between torque control and speed control of the main motors on the basis of the position information on the axles. That is, when at least one of the axles to be controlled by the inverter is within the gauge conversion section, speed control is performed so as to make the rotation speeds of the axles agree with the train speed. In addition, when all the axles to be controlled by the inverter are located outside the gauge conversion section, torque control is performed on the basis of the operation command so as to allow the driving force of the wheels to contribute to propulsion of the train.

Figure 7:
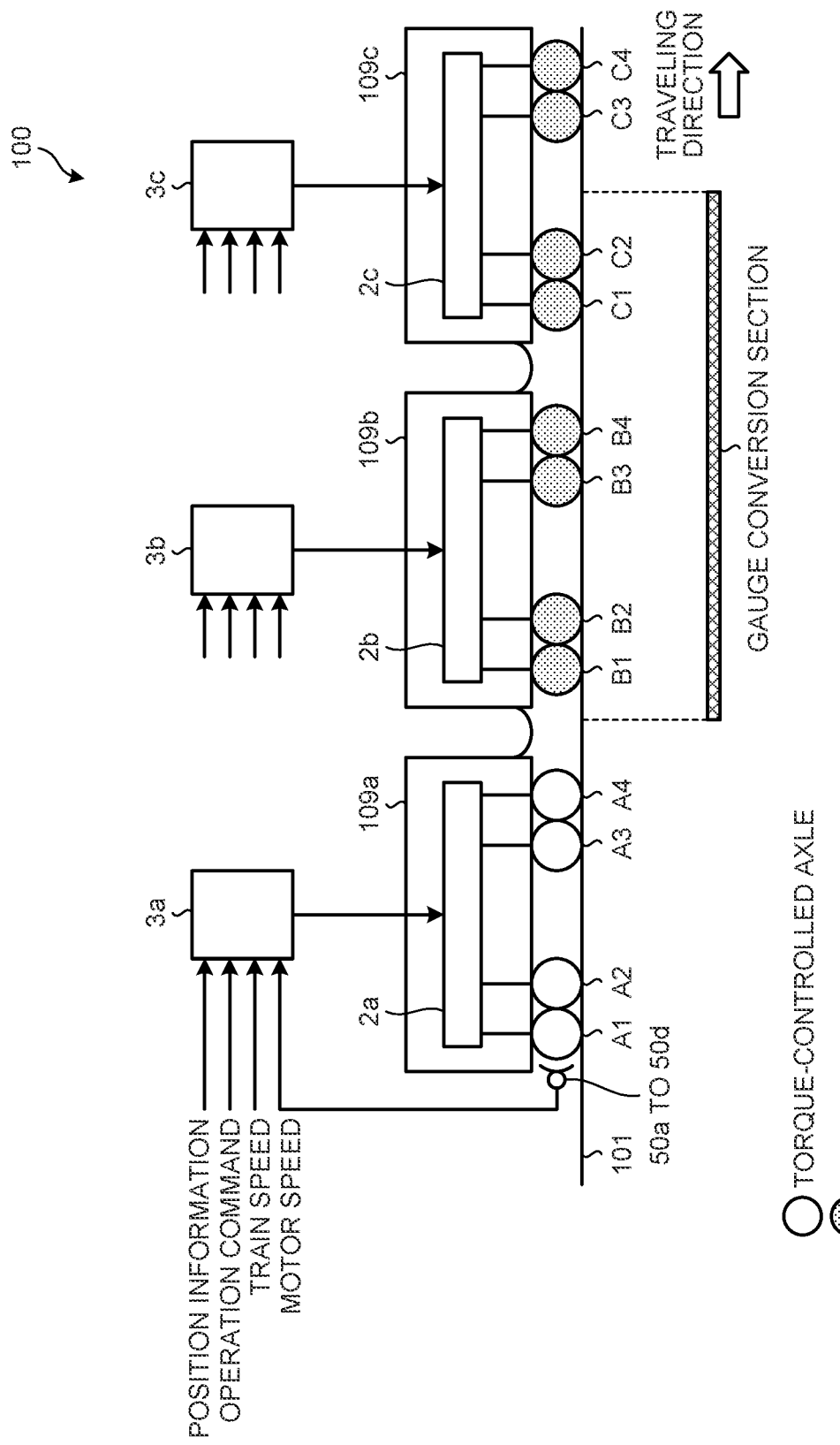
FIG. 7 is a schematic diagram describing an operating state of a variable-gauge train including three train cars at a certain point of time in the course of passage of the variable-gauge train through a gauge conversion section.

FIG. 7 is a schematic diagram describing an operating state of the variable-gauge train 100 including three train cars 109a to 109c at a certain point of time in the course of passage of the variable-gauge train 100 through the gauge conversion section. In FIG. 7, constituent parts that are the same as or equivalent to those in FIG. 2 are designated by the same reference numerals. Furthermore, signals to be input to voltage control units 3b and 3c are not illustrated as long as the signals are the same as those to be input to a voltage control units 3a. Furthermore, reference characters A1 to A4, B1 to B4, and C1 to C4 assigned to the wheels denote the axles in FIG. 7. Moreover, in FIG. 7, an open axle represents a torque-controlled axle, and a hatched axle represents a speed-controlled axle.

In FIG. 7, the axles B1 to B4 to be controlled by an inverter 2b are all within the gauge conversion section, and are racing. Therefore, the voltage control unit 3*b* performs speed control so that the rotation speeds of the axles B1 to B4 agree with the train speed. The voltage control unit 3*c* also performs speed control as with the voltage control unit 3*b*. Meanwhile, the axles A1 to A4 to be controlled by an inverter 2*a* are all located outside the gauge conversion section, and are in contact with the rails. Therefore, the voltage control unit 3*a* performs torque control based on the operation command, and the axles A1 to A4 are controlled so that the driving force contributes to propulsion of the train.

Figure 8:
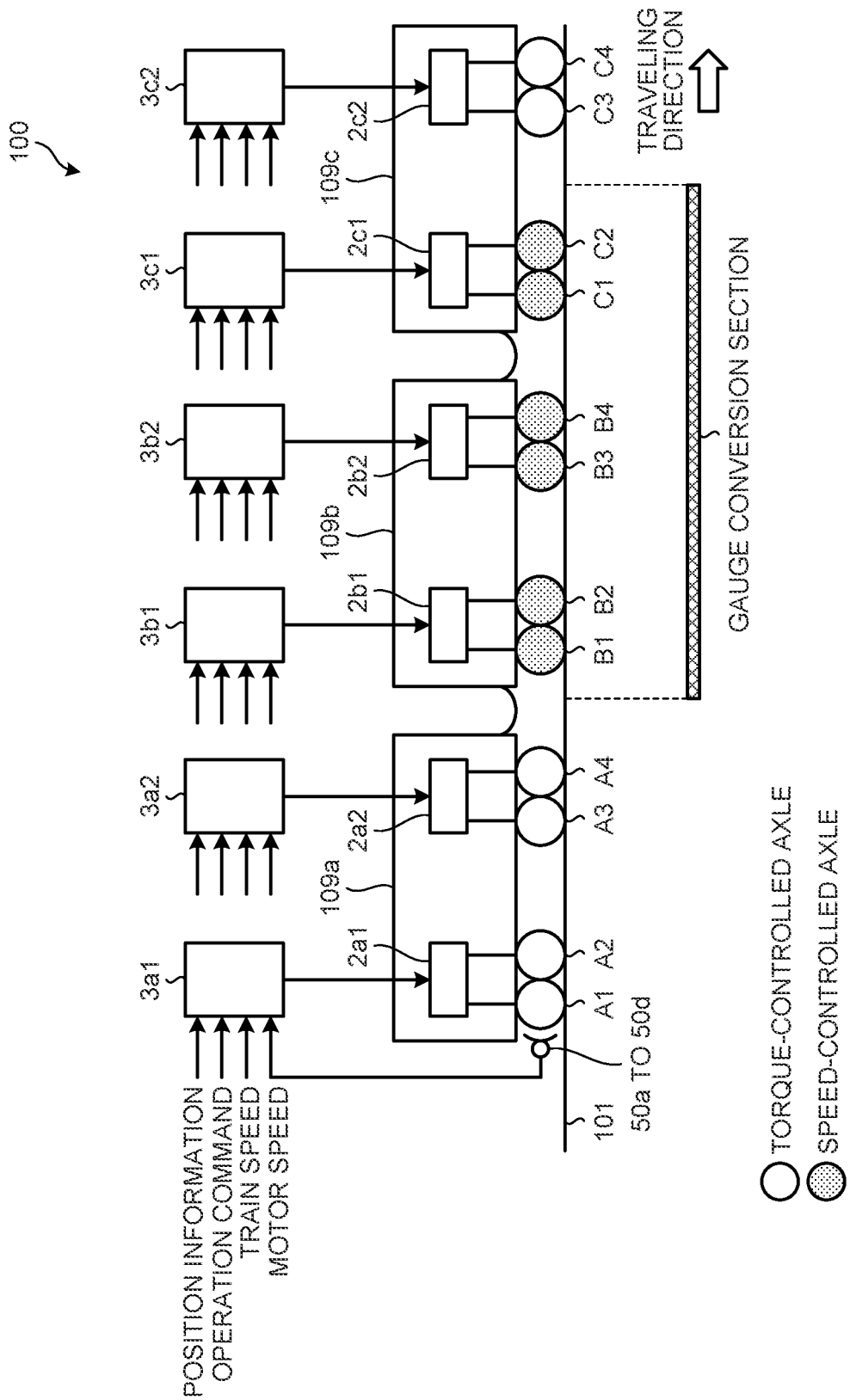
FIG. 8 is another schematic diagram describing an operating state of the variable-gauge train including the three train cars at a certain point of time in the course of passage of the variable-gauge train through the gauge conversion section.

FIG. 8 is another schematic diagram describing an operating state of the variable-gauge train 100 including the three train cars 109*a* to 109*c*. at a certain point of time in the course of passage of the variable-gauge train 100 through the gauge conversion section. FIG. 8 differs from FIG. 7 in that axles connected to two main motors (not illustrated) are controlled by each inverter. In FIG. 8, constituent parts that are the same as or equivalent to those in FIGS. 2 and 7 are designated by the same reference numerals, and duplicate description will be omitted. Furthermore, signals to be input to voltage control units 3*a*2, 3*b*1, 3*b*2, 3*c*1, and 3*c*2 are not illustrated as long as the signals are the same as those to be input to a voltage control unit 3*a*1.

In FIG. 8, the axles B1 and B2 to be controlled by an inverter 2*b*1 are within the gauge conversion section, and are racing. Therefore, the voltage control unit 3*b*1 performs speed control so that the rotation speeds of the axles B1 and B2 agree with the train speed. The same applies to the voltage control units 3*b*2 and 3*c*1. The voltage control unit 3*b*2 controls an inverter 2*b*2 to perform speed control so that the rotation speeds of the axles B3 and B4 agree with the train speed. The voltage control unit 3*c*1 controls an inverter 2*c*1 to perform speed control so that the rotation speeds of the axles C1 and C2 agree with the train speed. Meanwhile, respective axles to be controlled by inverters 2*a*1, 2*a*2, and 2*c*2 are all located outside the gauge conversion section. Accordingly, the inverters 2*a*1, 2*a*2, and 2*c*2 perform torque control based on the operation command. Therefore, the axles A1 to A4 and the axles C3 and C4 are controlled so that the driving force contributes to propulsion of the train.

As described above, the operation of the voltage control unit 3 in the first, embodiment does not depend on the number of main motors to be controlled by a single inverter. Furthermore, a plurality of axles to be controlled by a single inverter may be placed at a plurality of train cars. Moreover, an inverter and an axle to be controlled by the inverter may be separately placed at different train cars.

Furthermore, in the present embodiment, the variable-gauge train 100 is equipped with a plurality of the inverters 2 and the voltage control units 3 equal in number to the inverters 2, so that a variable-gauge train propulsion control system is formed. The axles are arranged such that even when an axle to be controlled by some inverter 2 is within the gauge conversion section, all axles to be controlled by at least one of the other inverters 2 are located outside the gauge conversion section. For example, in the case of the variable-gauge train 100 having the configuration illustrated in FIG. 7, the length of the gauge conversion section is shorter than the distance between the axle A4 and the axle C1. Furthermore, in the case of the variable-gauge train 100 having the configuration illustrated in FIG. 8, the length of the gauge conversion section is shorter than the distance between the axle A2 and the axle C3. That is, at least one or the axles can be always controlled such that the driving force contributes to propulsion of the train. Therefore, even if the variable-gauge train 100 stops in the course of passing through the gauge conversion section, the variable-gauge train 100 can be accelerated again to thereby pass through the gauge conversion section. Furthermore, even when such a change in the speed of the variable-gauge train 100 occurs in the course of passage of the variable-gauge train 100 through the gauge conversion section, the rotation speed of the axle within the gauge conversion section is controlled so that the rotation speed of the axle agrees with the train speed. Therefore, friction between wheels of the axle and rails is reduced when that axle gets out of the gauge conversion section.

Supplemental remarks are made below as to behavior when some of the axles A1 to A4, the axles B1 to B4, and the axles C1 to C4 are within the gauge conversion section but the other axles are located outside the gauge conversion section.

In FIG. 7, among the axles to be controlled by an inverter 2*c*, the axles C1 and C2 are within the gauge conversion section, and are racing. Meanwhile, the axles C3 and C4 are located outside the gauge conversion section, and are in contact with rails of a track 101, and are subjected to the weight of the train car 109*c*. Therefore, the rotation speeds of the axles C3 and C4 agree with the train speed unless the wheels of the axles C3 and C4 race beyond the limit of adhesion.

For example, when the train speed increases slightly in the state illustrated in FIG. 7, the rotation speeds of the axles C3 and C4 increase in synchronization with the train speed. Meanwhile, the rotation speeds of the axles C1 and C2 become lower than the train speed. Then, the reference frequency $f_n$ becomes smaller than the rotational frequencies of the axles C3 and C4 and larger than the rotational frequencies of the axles C1 and C2. As a result, the slip frequencies of main motors corresponding to the axles C1 and C2 increase due to the change in the reference frequency $f_n$. Furthermore, since the torque command calculation unit 30 calculates a positive torque command value, the axles C1 and C2 are accelerated. At this time, driving force for accelerating or decelerating the train car 109*c* is also generated on the axles C3 and C4. However, it is possible to prevent problems such as vibration of the train body and deterioration of riding comfort from arising because if the above control is continued from the time when all the axles C1 to C4 are within the gauge conversion section, there is no big difference between the respective rotation speeds of the axles C1 to C4. Given that a target value set by the speed control is the train speed, it is desirable that the resolution of information regarding the train speed be as high as possible and an updating cycle be as short as possible.

Note that a mechanical brake and a control apparatus that controls the mechanical brake (hereinafter, the brake and the control apparatus is collectively referred to as a "brake control apparatus") are provided for each axle of the variable-gauge train. When a running train car or train decelerates during normal running, a regenerative brake to be applied by the inverter and the main motor is used together with the mechanical brake.

When any axle of the variable-gauge train is within the gauge conversion section, a problem arises if the mechanical brake is applied to that axle. As already described, the wheels race within the gauge conversion section. In other words, an axle racing within the gauge conversion section is not subjected to the weight of the train body, and an adhesive force due to friction between wheels and rails is not produced, either. When the mechanical brake is applied to such an axle, thus, rotation of the axle and the wheels is expected to be easily locked.

Meanwhile, as is described above, the control apparatus according to the first embodiment performs speed control such that the rotation speed of the axle agrees with the train speed. If the speed of the main motor is controlled while rotation of the axle is locked due to the mechanical brake, torque generated by the main motor under the control of the inverter interferes with torque generated by the mechanical, brake. For this reason, it is desirable that the mechanical brake be not applied to the axle within the gauge conversion section.

For the control apparatus according to the first embodiment, when at least one of axles to be controlled by an inverter is within the gauge conversion section, the voltage control unit for the inverter controls the speeds of main motors so that the rotation speed of the axle agrees with the train speed. This control makes it possible to prevent creation of the difference between the rotation speed of the axle racing within the gauge conversion section and the train speed and to prevent the wheels and the rails from wearing away due to friction therebetween.

Note that in the control apparatus according to the first embodiment, it is desirable for the voltage control unit for an inverter to control the torque of main motors on the basis of the operation command when all axles to be controlled by the inverter are located outside the gauge conversion section. This control allows the driving force of the axles to contribute to propulsion of the variable-gauge train.

Second Embodiment

In the first embodiment, a method for switching calculation processing to be performed by the torque command calculation unit 30 on the basis of position information on axles has been described as a specific method for controlling the speed of an axle to be controlled by the inverter 2. For the method of the first embodiment, it is necessary to adjust the gauge conversion torque pattern or control gain of the speed controller. In view of this, a second embodiment described below gives a method for controlling the speeds of main motors in a simpler manner in the case where the main motors are induction motors.

Figure 9:
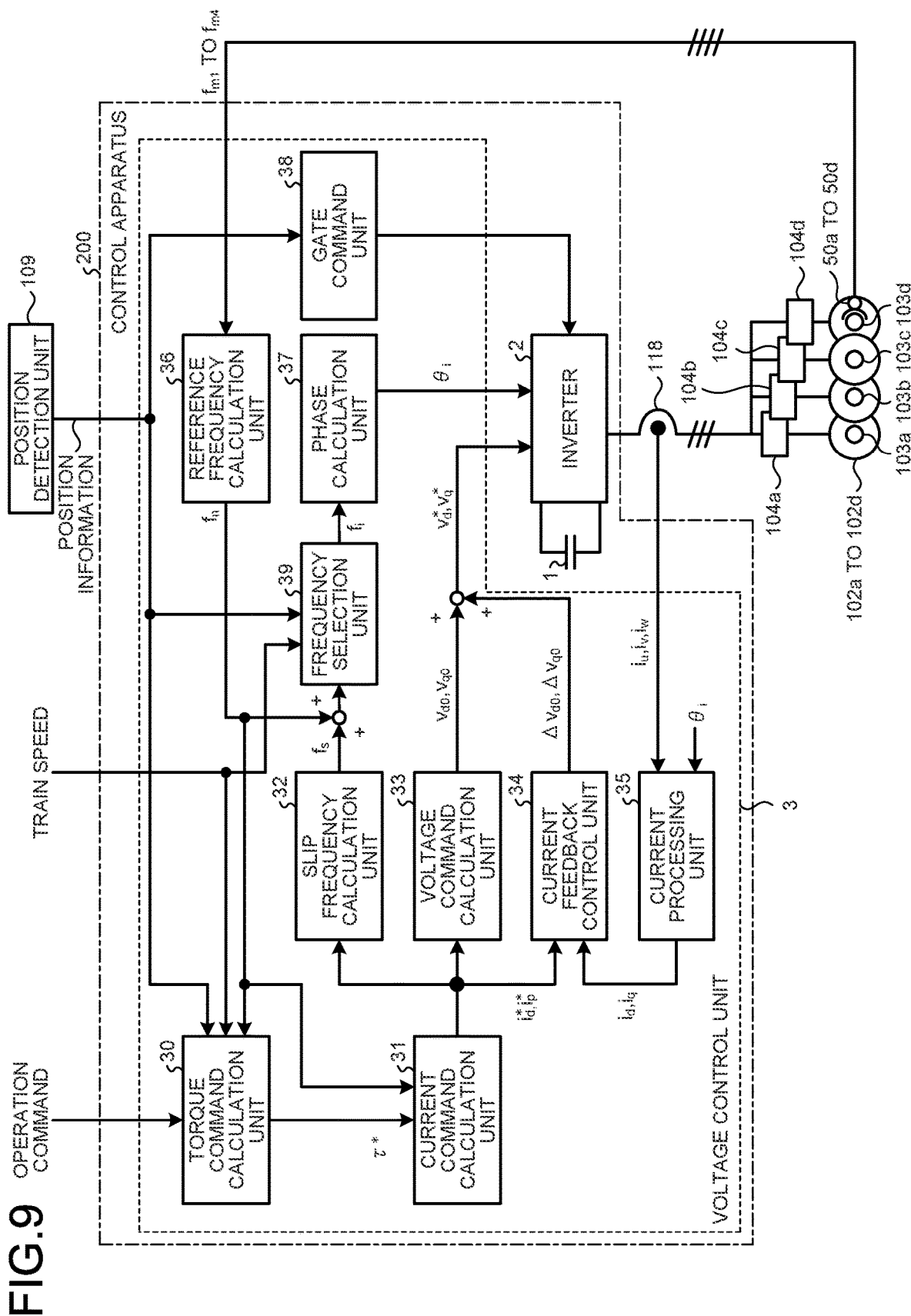
FIG. 9 is a block diagram illustrating a configuration of a control apparatus according to a second embodiment.

FIG. 9 is a block diagram illustrating a configuration of a control apparatus according to the second embodiment. The control apparatus 200 according to the second embodiment is different from the first embodiment in that a frequency selection unit 39 is provided at a stage prior to the phase calculation unit 37 in the configuration of the control apparatus 200 according to the first embodiment illustrated in FIG. 2. Except for this point, the configuration of the second embodiment is the same as or equivalent to the configuration of the first embodiment illustrated in FIG. 2. Thus, the same or equivalent constituent parts are designated by the same reference numerals, and duplicate description will be omitted.

Next, operation of the frequency selection unit 39 in the second embodiment will be described. The frequency selection unit 39 acquires position information on the four axles 103a to 103d from the position detection unit 109. Then, when at least one of the axles 103a to 103d is within the gauge conversion section, the frequency selection unit 39 outputs, as the inverter frequency $f_i$, a frequency-converted train speed obtained by conversion of a train speed into a motor electric frequency. Furthermore, when all the axles 103a to 103d are located outside the gauge conversion section, the frequency selection unit 39 outputs, as the inverter frequency $f_i$, a result of adding the reference frequency $f_n$ output from the reference frequency calculation unit 36 to the slip frequency command $f_s$ output from the slip frequency calculation unit 32.

Next, the significance of operating the frequency selection unit 39 as described above will be described. As described above, an axle races in the gauge conversion section. At this time, the load torque of a main motor corresponding to the racing axle is significantly smaller than that in the case where wheels are in contact with rails. With friction and windage loss ignored, the load torque of the main motor corresponding to the racing axle is substantially equal to zero. An induction motor with zero load torque rotates at the slip frequency of zero with the rotational frequency of a rotor being equal to the frequency of an applied voltage. Therefore, when the frequency selection unit 39 outputs the frequency-converted train speed as the inverter frequency $f_i$, the rotation speed of the axle racing within the gauge conversion section is controlled such that the rotation speed is substantially equal to the train speed. That is, as in the first embodiment, the speed of rotation of the axle racing within the gauge conversion section is controlled setting the train speed as a target value.

In FIG. 7, the axles B1 to B4 to be controlled by an inverter 2b are all within the gauge conversion section, and are racing. Therefore, the frequency selection unit 39 of the voltage control unit 3b outputs the frequency-converted train speed as the inverter frequency fi. As a result, speed is controlled so that the rotation speeds of the axles B1 to B4 agree with the train speed. The voltage control unit 3c also performs speed control as with the voltage control unit 3b. Meanwhile, the axles A1 to A4 to be controlled by an inverter 2a are all located outside the gauge conversion section, and are in contact with the rails. Therefore, the frequency selection unit 39 of the voltage control unit 3a outputs, as the inverter frequency fi, a result of adding the reference frequency fn to the slip frequency command fs. As a result, the torque of the axles A1 to A4 is controlled so that the driving force contributes to propulsion of the train.

Supplemental remarks are made below as to behavior when some of the axles A1 to A4, the axles B1 to B4, and the axles C1 to C4 are within the gauge conversion section and the other axles are located outside the gauge conversion section.

Reference is made back to FIG. 7. Of the axles to be controlled by an inverter 2c, the axles C1 and C2 are within the gauge conversion section, and are racing. Meanwhile, the axles C3 and C4 are located outside the gauge conversion section, and the wheels of the axles C3 and C4 are in contact with the rails of the track 101. Then, the same voltage is applied by the inverter 2c to the main motors corresponding to the axles C1 to C4.

The rotation speeds of the wheels in contact with the rails agree with the train speed, except where the wheels are racing beyond the limit of adhesion. Therefore, the main motors corresponding to the axles C3 and C4 are rotating at a frequency equal to the frequency-converted train speed, and a voltage having the frequency equal to the frequency-converted train speed is applied to the main motors corresponding to the axles C3 and C4. As a result, the main motors corresponding to the axles C3 and C4 achieves the slip frequency of zero, which generates no torque.

The block diagram of the control apparatus 200 according to the second embodiment illustrated in FIG. 9 is equivalent in configuration to the block diagram of the control apparatus 200 according to the first embodiment illustrated in FIG. 2 in terms of signals to be input to and output from the torque command calculation unit 30. As described above, while the frequency selection unit 39 outputs the frequency-converted train speed as the inverter frequency $f_i$, the slip frequency command $f_s$ is ignored, so that the torque of all the motors becomes substantially zero. That is, when at least one of the axles 103a to 103d is within the gauge conversion section, a change in the torque command value τ* is not reflected in torque generated in the main motors 104a to 104d. Therefore, the control apparatus 200 according to the second embodiment is not affected by calculation performed by the torque command calculation unit 30 and, calculation to be performed by the torque command calculation unit 30 is not particularly limited.

Thus, in the control apparatus according to the second embodiment, when a plurality of main motors that are induction motors is controlled by a single inverter, the frequency-converted train speed obtained by conversion of the train speed into the motor electric frequency is used as the frequency of the output voltage of the inverter. Therefore, it is possible to easily achieve speed control of the main motors without the need for adjustment of the torque pattern, the speed controller, and the like, so that the same effect as that of the first embodiment can be achieved.

Third Embodiment

In the first and second embodiments, the rotation speed of an axle racing within the gauge conversion section is controlled so that the rotation speed agrees with the train speed. Such control is performed for the purpose of preventing friction between wheels and rails and wearing-away of the wheels and the rails due to the difference between the train speed and a racing speed of an axle is when the axle gets out of the gauge conversion section. However, when it is determined that the train speed is sufficiently low and the degree of friction/wearing-away is slight, it is not necessary to continue the speed control of main motors.

Figure 10:
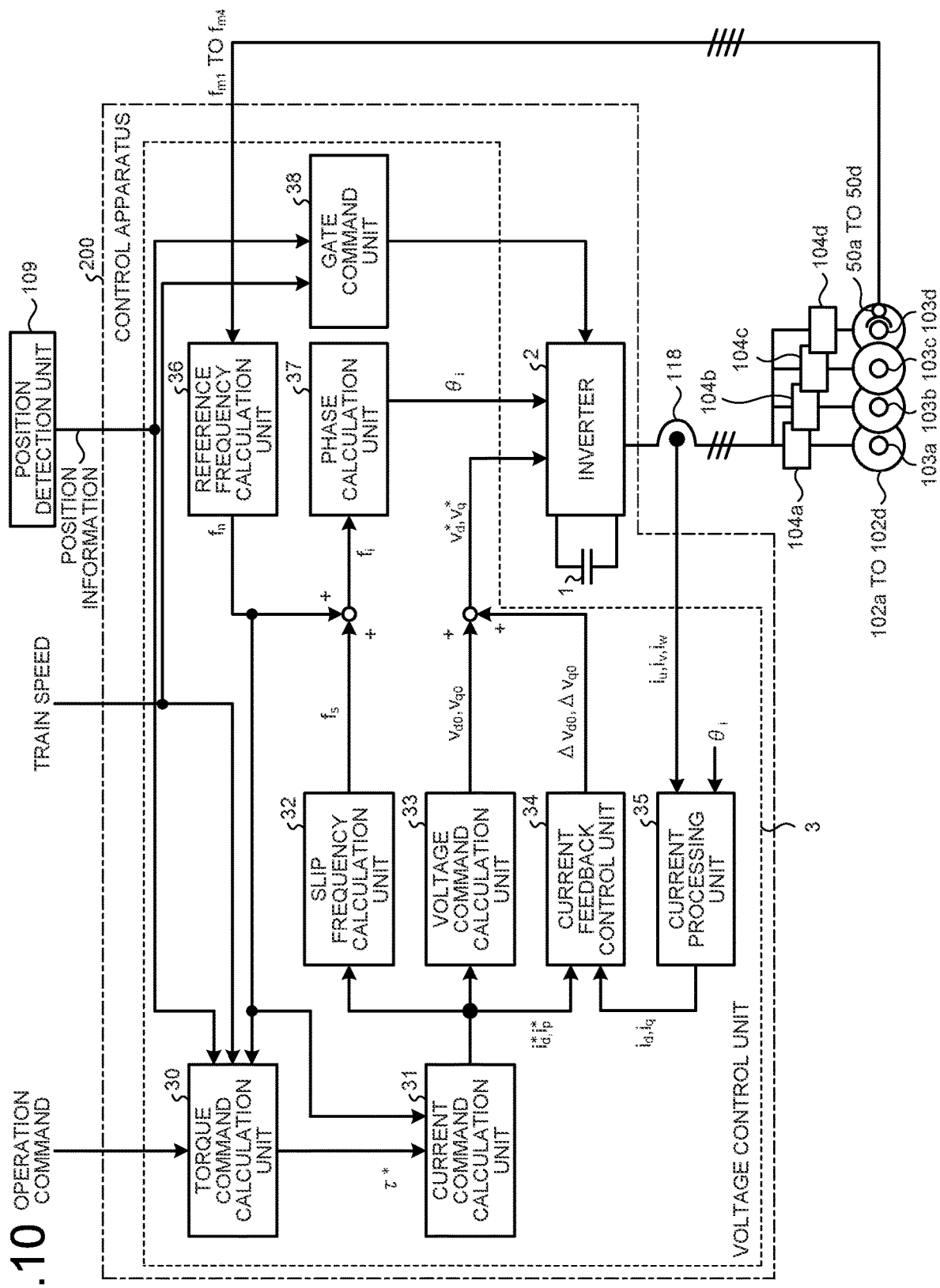
FIG. 10 is a block diagram illustrating a configuration of a control apparatus according to a third embodiment.

Operation of a control apparatus according to the third embodiment will be described with reference to FIGS. 10 and 11. FIG. 10 is a block diagram illustrating a configuration of the control apparatus according to the third embodiment. The control apparatus 200 according to the third embodiment is different from the first embodiment in that information on a train speed is input to a gate command unit 38 in the configuration of the control apparatus 200 according to the first embodiment illustrated in FIG. 2. Except for this point, the configuration of the second embodiment is the same as or equivalent to the configuration of the first embodiment illustrated in FIG. 2. Thus, the same or equivalent constituent parts are designated by the same reference numerals, and duplicate description will be omitted. Furthermore, FIG. 11 is a flowchart for describing operation of a main part in the third embodiment.

The gate command unit 38 performs control processing illustrated in FIG. 11, specifically, processing for placing gate signal output to the inverter 2 in an on state or off state, that is, processing for switching between gate-on and gate-off (hereinafter referred to as "on/off switching processing"). In FIG. 11, when at least one of the axles 103a to 103d is within the gauge conversion section (step S301, Yes) and the train speed is equal to or lower than a first speed which is a determination value (step S302, Yes), the gate command unit 38 performs processing for stopping the gate signal output to the inverter 2 or maintaining the stopped state of the gate signal output (step S303), which in turn completes the process of the flowchart of FIG. 11.

Figure 11:
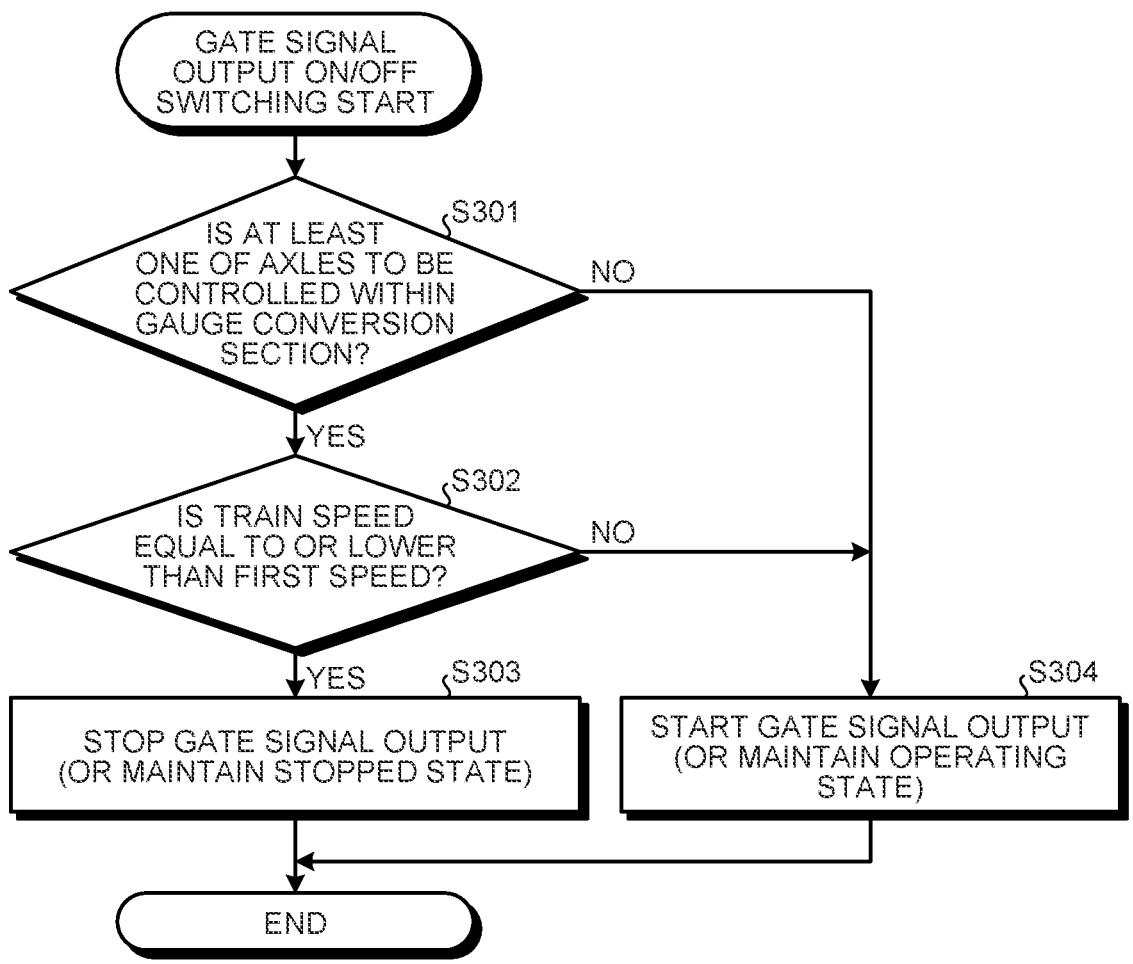
FIG. 11 is a flowchart for describing operation of a main part in the third embodiment.

Furthermore, when at least one of the axles 103a to 103d is within the gauge conversion section (step S301, Yes) and the train speed is higher than the first speed (step S302, No), the gate command unit 38 performs processing for starting the gate signal output to the inverter 2 or maintaining the operating state of the gate signal output (step S304), which in turn completes the process of the flowchart of FIG. 11.

Moreover, when all the axles 103a to 103d are located outside the gauge conversion section (step S301, No), the gate command unit 38 performs processing for starting the gate signal output to the inverter 2 or maintaining the operating state of the gate signal output (step S304), which in turn completes the process of the flowchart of FIG. 11.

Note that in the determination process of step S302 described above, determination of "Yes" is made when the train speed and the first speed are equal, but determination of "No" may be made instead. That is, either determination of "Yes" or "No" may be made when the train speed and the first speed are equal.

The gate command unit 38 performs processing for switching the operating states of the inverter 2 during gauge conversion operation, as described above, and another functional block (not illustrated in FIG. 10 can perform the on/off switching processing for the gate signal output to the inverter 2. For example, when an anomaly is detected in a device or when an emergency stop operation is performed at the train driver's discretion, the on/off switching processing should be given priority over the processing to be performed by the gate command unit 38 and the process illustrated in the flowchart of FIG. 11.

Note that while the third embodiment gives an example in which the configuration that performs the gate-off on the inverter when the train speed is lower than the first speed is applied to the control apparatus 200 according to the first embodiment, it goes without saying that this configuration can be applied to the control apparatus 200 according to the second embodiment.

Thus, the control, apparatus according to the third embodiment can prevent unnecessary power consumption by performing the gate-off processing on the inverter when the train speed is lower than the determination value. Furthermore, when the train speed is higher than the determination value, the sane effect as that of the first embodiment can be achieved.

Fourth Embodiment

In a fourth embodiment, a hardware configuration for implementing the functions related to the voltage control units 3 of the first to third embodiments with software will be described with reference to FIG. 12. Mote that these functions refer to the torque command calculation unit 30, the current command calculation unit 31, the slip frequency calculation unit 32, the voltage command calculation unit 33, the current feedback control unit 34, the current processing unit 35, the reference frequency calculation unit 36, the phase calculation unit 37, the gate command unit 38, and the frequency selection unit 39 in the voltage control unit 3.

Figure 12:
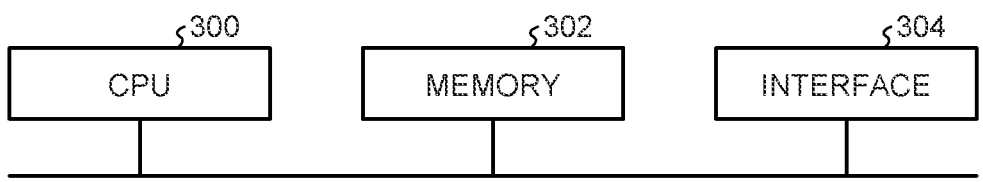
FIG. 12 is a block diagram illustrating an example of a hardware configuration in the case where functions related to voltage control units of the first to third embodiments are implemented by software.

When the above-described functions are implemented by software, the hardware configuration may include a central processing unit (CPU) 300, a memory 302, and an interface 304, as illustrated in FIG. 12. The CPU 300 performs operations. A program to be read by the CPU 300 is stored in the memory 302. The interface 304 is for inputting/outputting signals. Note that the CPU 300 may be a device that is referred to as an arithmetic unit, a microprocessor, a microcomputer, a processor, a digital signal processor (DSP), or the like. Furthermore, examples of the memory 302 include nonvolatile or volatile semiconductor memories such as a random access memory (RAM), a read only memory (ROM), a flash memory, an erasable programmable ROM (EPROM), and an electrically EPROM (EEPROM) (registered trademark).

Specifically, a program for executing a control function is stored in the memory 302. The CPU 300 performs various types of arithmetic processing described in the present embodiment by exchanging necessary information via the interface 304.

Figure 13:
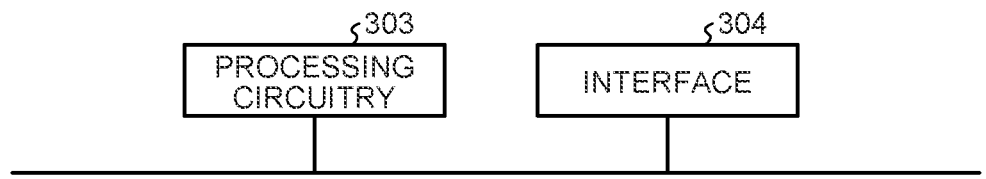
FIG. 13 is a block diagram illustrating another example of the hardware configuration related to the voltage control units of the first to third embodiments.

Furthermore, the CPU 300 and the memory 302 illustrated in FIG. 12 may be replaced with a piece of processing circuitry 303 as illustrated in FIG. 13. For example, a single circuit, a composite circuit, a programmed processor, a parallel-programmed processor, an application specific integrated circuit (ASIC), a field-programmable gate array (FPGA), or a combination thereof is applicable to the piece of processing circuitry 303.

Finally, switching elements to be used in the inverters in the control apparatuses of the first to third embodiments will be described. Semiconductor devices (IGBT, MOSFET, diode, and the like, hereinafter referred to as "silicon (Si) devices") made of Si are generally used as the switching elements to be used in the inverters of the first to third embodiments. Meanwhile, silicon carbide (SiC) is attracting attention in recent years, and semiconductor devices made of SiC instead of Si (hereinafter referred to as "SiC devices") are attracting attention these days.

In the case of SiC devices, switching time can be significantly reduced (about 1/10 or less) compared with conventional devices (for example, Si devices). This is a characteristic of SiC devices. Therefore, switching loss is reduced. In addition, SiC devices also have a low conduction loss. Therefore, loss in a stationary state can also be significantly reduced (about 1/10 or less) compared with the conventional devices.

The feature of the methods according to the first and second embodiments is to perform control such that the gate-on continues to be performed on the inverter even when the variable-gauge train 100 passes through the gauge conversion section as described above. Furthermore, the method according to the third embodiment also performs control such that the gate-on continues to be performed on the inverter when the train speed is higher than the first speed, as in the first and second embodiments. Therefore, the number of times the switching operation is performed by the switching element increases compared with the case where the gate-on is performed on the inverter when the variable-gauge train 100 passes through the gauge conversion section. In addition, current flowing through the main motor that drives racing wheels decreases, but exciting current continues to flow. Therefore, SiC devices having a low switching loss and conduction loss are suitable for use in the control apparatus according to the present embodiment.

Note that SiC has a larger bandgap than Si, and is thus regarded as an example of a semiconductor referred to as a wide bandgap semiconductor. Semiconductors formed by use of materials other than SiC, such as gallium nitride-based materials or diamond, also belong to wide bandgap semiconductors, and many of characteristics of such semiconductors are similar to those of silicon carbide. Therefore, a configuration in which a wide bandgap semiconductor other than SiC is used also forms the gist of the present invention.

Note that the configuration illustrated in each of the above embodiments illustrates an example of the subject matter of the present invention, and it is possible to combine the configuration with another technique that is publicly known, and is also possible to omit or change part of the configuration without departing from the gist of the present invention.

REFERENCE SIGNS LIST

1 DC power source; 2, 2a, 2b, 2c, 2a1, 2a2, 2b1, 2b2, 2c1, 2c2 inverter; 3, 3a, 3b, 3c, 3a1, 3a2, 3b1, 3b2, 3c1, 3c2 voltage control unit; 30 torque command calculation unit; 30a mode switching determination unit; 30b gauge conversion torque pattern generation unit; 30c normal running torque pattern generation unit; 30d torque command value selection unit; 30e speed controller; 31 current command calculation unit; 32 slip frequency calculation unit; 33 voltage command calculation unit; 34 current feedback control unit; 35 current processing unit; 36 reference frequency calculation unit; 37 phase calculation unit; 38 gate command unit; 39 frequency selection unit; 50a to 50d rotation sensor; 100 variable-gauge train; 101a, 101b track; 102a to 102d wheel; 103a to 103d, A1 to A4, B1 to B4, C1 to C4 axle; 104a to 104d main motor; 106 gauge converter; 107 body support; 108 guide rail; 109 position detection unit; 109a, 109b, 109c train car; 118 current sensor; 200 control apparatus; 300 CPU; 302 memory; 303 processing circuitry; 304 interface.

The invention claimed is:

1. A variable-gauge train control apparatus to be applied to a variable-gauge train and to control a plurality of main motors that transmits driving force to axles of the variable-gauge train, the train having a gauge that changes in a gauge conversion section, the apparatus comprising:
   an inverter to output voltage to at least one of the main motors; and
   a voltage controller to control an output voltage of the inverter,
   wherein when at least one of the axles to be subjected to the driving force controlled by the inverter is within the gauge conversion section, the voltage controller controls speeds of the main motors by using, as a speed command value, a train speed converted into a rotational frequency, and
   wherein the voltage controller includes a torque command calculator, and when at least one of the axles to be subjected to the driving force controlled by the inverter is within the gauge conversion section, the torque command calculator calculates a torque command value based on a basis of a speed deviation of an actual rotation speed of the main motor to which the inverter outputs voltage, from the train speed converted into the rotational frequency.

2. The variable-gauge train control apparatus according to claim 1, wherein when all the axles to be subjected to the driving force controlled by the inverter are located outside the gauge conversion section, the voltage controller controls torque of the main motors on a basis of an operation command to determine propulsive force of the variable-gauge train.

3. The variable-gauge train control apparatus according to claim 1, wherein when at least one of the axles to be subjected to the driving force controlled by the inverter is within the gauge conversion section, the voltage controller treats the train speed converted into electric frequencies of the main motors, as a frequency of the output voltage.

4. The variable-gauge train control apparatus according to claim 1, wherein when at least one of the axles to be subjected to the driving force controlled by the inverter is within the gauge conversion section and the train speed is lower than a first speed, the voltage controller generates a command to stop output of voltage from the inverter.

5. The variable-gauge train control apparatus according to claim 1, wherein a material of a switching element to be used in the inverter is a wide bandgap semiconductor.

6. The variable-gauge train control apparatus according to claim 5, wherein the wide bandgap semiconductor is silicon carbide, gallium nitride-based material, or diamond.

7. A variable-gauge train propulsion control system for a variable-gauge train having a gauge that changes in a gauge conversion section, the system comprising:
- a plurality of main motors to transmit driving force to axles of the train;
- a plurality of inverters to output voltage to at least one of the main motors; and
- a plurality of voltage controllers to control individual output voltages of the plurality of inverters, wherein each of the voltage controllers corresponds one of the inverters and, when at least one of the axles to be subjected to the driving force controlled by the corresponding one inverter is within the gauge conversion section, controls speeds of the main motors by using, as a speed command value, a train speed converted into a rotational frequency, and
- wherein each voltage controller includes a torque command calculator, and when at least one of the axles to be subjected to the driving force controlled by the inverter is within the gauge conversion section, the torque command calculator calculates a torque command value on a basis of a speed deviation of an actual rotation speed of the main motor to which the inverter outputs voltage, from the train speed converted into the rotational frequency.

8. The variable-gauge train propulsion control system according to claim 7, wherein each of the voltage controllers corresponds to one of the inverters and, when all the axles to be subjected to the driving force controlled by the corresponding one inverter are located outside the gauge conversion section, controls torque of the main motors on a basis of-an operation command to determine propulsive force of the variable-gauge train.

* * * * *